United States Patent [19]

Thornton et al.

[11] 4,055,835
[45] Oct. 25, 1977

[54] LINE-SEIZING APPARATUS

[75] Inventors: Douglas R. Thornton, Maywood; Jerome Smiglee, Chicago, both of Ill.

[73] Assignee: Manitou Systems, Inc., Bensenville, Ill.

[21] Appl. No.: 702,001

[22] Filed: July 2, 1976

Related U.S. Application Data

[63] Continuation of Ser. No. 605,754, Aug. 18, 1975, abandoned.

[51] Int. Cl.$^2$ ............................................. H04Q 3/00
[52] U.S. Cl. ......................... 340/147 LP; 340/152 R
[58] Field of Search ................... 340/147 LP, 152 R; 179/15 BA; 307/232; 328/99, 109, 137, 152; 178/50, 58, 66

[56] References Cited

U.S. PATENT DOCUMENTS

| | | | |
|---|---|---|---|
| 3,691,527 | 9/1972 | Yamamoto | 340/149 A |
| 3,691,528 | 9/1972 | Calvagna | 340/152 R |

OTHER PUBLICATIONS

*IBM Tech. Discl. Bull.*, vol. 5, No. 10, Mar. 1963, pp. 57-58, R. L. Brady, "Cross Channel Switch."

*Primary Examiner*—Harold I. Pitts
*Attorney, Agent, or Firm*—Neuman, Williams, Anderson & Olson

[57] ABSTRACT

Line-seizing circuitry is disclosed by which a plurality of remote terminals may be connected to a central data recorder over a single two-wire data line with only one terminal being in communication with the recorder at any one time. Tie-breaking circuitry is included to prevent two remote units from going onto the data line simultaneously. A current source is placed across the line and when any terminal goes on the line, a resistor is also placed across the line reducing the voltage thereon below a first voltage level; the other terminals sense that low voltage and are prevented from going on the line. Each terminal includes an oscillator and may go on line only during an output pulse of the oscillator. If two terminals should attempt to go on the line simultaneously, the voltage across the line is reduced below a second and lower voltage level, and both terminals are removed from the line. Each terminal then repeatedly attempts to go on line with every output pulse of its respective oscillator until the different frequencies of the separate oscillators causes one to go on the line a sufficient period of time prior to the second that the second is held off the line.

11 Claims, 6 Drawing Figures

| INQUIRY NUMBER | | RESPONSE NUMBER | | COUNTER STATUS | | MEMORY LATCH | | | PUNCH LATCH | | |
|---|---|---|---|---|---|---|---|---|---|---|---|
| | | | | | | 0 | 1 | 2 | 0 | 1 | 2 |
| 0 | — | BADGE INSERTED | BADGE REMOVED | | | | | | FM | FM | FM |
| 1 | N ⎫ TERMINAL | 2 | N ⎫ TERMINAL | 1 | DA | DA | — | DA | 0 | — | 2 |
| 2 | N ⎭ NUMBER | N | N ⎭ NUMBER | 2 | IN1 | DA | — | DA | N | N ⎫ TERMINAL NUMBER | N |
| 3 | N ⎫ DEPT | N ⎫ TOTAL | | 3 | IN2 | DA | — | DA | N | N ⎭ | N ⎫ |
| 4 | N ⎭ NUMBER | N ⎭ COPY COUNT | | 4 | | DA, SEC | — | DA | | N | N ⎭ |
| 5 | N ⎫ USER | N | | 5 | | DA, SEC | — | DA | | N ⎫ DEPT. NUMBER | |
| 6 | N ⎭ NUMBER | N ⎫ MULTIPLE | | 6 | | DA, SEC | — | DA | | N ⎭ | |
| 7 | N ⎫ PRIVILEGE | N ⎭ COPY COUNT | | 7 | | DA, SEC | — | DA | | N ⎫ USER NUMBER | |
| 8 | N ⎭ NUMBER | N | | 8 | | DA, SEC | — | DA | | N ⎭ | |
| 9 | N ⎫ SECURITY | N | | 9 | TC | TC, SEC, SECCL | N | DA | | N ⎫ | N ⎫ TOTAL COPY COUNT |
| 10 | N ⎭ NUMBER | N | | 10 | TC | TC, SEC, | N ⎫ TIME | DA | | N ⎫ TIME CODE | N ⎭ |
| 11 | | | | 11 | TC | TC, SEC | N ⎭ CODE | DA | | N ⎭ | N |
| 12 | | | | 12 | TC | TC, SEC | N | DA | | N | N ⎫ MULTIPLE COPY COUNT |
| 13 | | | | 13 | TC | TC, SEC | N | | | N | N ⎭ |
| 14 | (ENABLE) | | | 14 | TC | TC | N | | | N | N |
| 15 | (EOC) | (EOC) | | 15 | TC | TC | N | | | N | |
| | | | | 0 | FM | FM | N | FM | | N | |

FIG. 5

LINE-SEIZING APPARATUS

CROSS-REFERENCE TO RELATED APPLICATION

This application discloses the subject matter and claims of a portion of the subject matter disclosed in the application of Douglas R. Thornton for Multiterminal Monitoring System filed on Mar. 31, 1975, and assigned Ser. No.563,382.

BACKGROUND OF THE INVENTION

Multiple remote terminal apparatus in which a plurality of remote terminals are coupled to a common or central data recording or processing device are well known. It is, of course, desirable that the separate terminals and the central recording appartus be connected together in as inexpensive a fashion as possible. Perhaps the least desirable way of making these connections is to run a separate cable or data line between each of the separate terminals and the central recording apparatus. When the terminals are located at a considerable distance from the central recording apparatus, merely the cost of the separate data lines themselves can be significant consideration. Moreover, and especially if the terminals and the central recording apparatus are to be located in an existing building or structure, the cost and inconvenience of installing multiple data lines can also be a significant consideration. In apparatus where the central recorder is to be in communication with only one of the terminals at any time, it is highly advantageous if each of the separate terminals can be placed on the same data line. One such apparatus is disclosed in the above-referenced patent applicaton.

However, when multiple terminals are connected to the same data line, it is necessary to ensure that only one of the terminals is on line and in communication with the central recorder at any one time. In polled systems wherein a terminal goes on line only after it receives a particular polling signal from the central recorder, this requirement is relatively easy to meet. In nonpolled systems wherein any terminal may attempt to go on line at randomly spaced times, the requirement becomes somewhat more difficult. Circuitry must then be provided to ensure that when one terminal is on line, no other terminals may go on line. Further, circuitry must be provided for insuring that if two or more terminals attempt to go on line essentially simultaneously, only one of the terminals will actually go on line.

A similar problem has been faced in the teletype field. When a number of teletype units are connected in parallel across a data line it is, of course, desirable that only one be operative at a time. In one commonly used circuit, each terminal includes a latching relay across the data line which must be closed for the terminal to be operative and a potential source in series with a pushbutton and the relay coil. A current source is also placed across the line. The circuit is such that when no terminals are on the data line and the switch associated with one is closed, the relay of that unit is latched closed which puts it on a line. However, latching the relay of one unit causes the potential across the data line to drop below the value required to latch the relays of any other units should their associated switches be closed. Thus, when one unit is on the data line, all other units are prevented from going on the data line. However, when a person desires to use a unit and the data line is in use, he must repeatedly close the switch associated with his unit until, eventually, he does so when there is no other unit on the line.

Other systems have previously been provided which merely monitor the data on the data line. The presence of invalid data is taken as an indication that more than one unit is on the line, and operation of all units on the line is simply terminated. Both of these approaches to the problem have disadvantages which are readily apparent. The first mentioned system does not automatically put a unit on the data line when it becomes free. Moreover, it can result in considerable inefficiencies in the operation of the system, especially where the messages to be transmitted over the data line are relatively short. The second mentioned system has the inherent inefficiency that once the presence of more than one unit on the line is detected, the use of all units is terminated resulting in an interruption in an ongoing communicaton.

SUMMARY OF THE INVENTION

There are provided by this invention line-seizing apparatus for use with multiple terminal systems by which the presence of one unit on the data line prevents any other units from coming on the line and wherein when a unit on the data line goes off, another unit ready to go on the data line automatically seizes it and, further, wherein when two units attempt to go on the line approximately simultaneously, the tie is automatically broken.

Thus, it is an object of this invention to provide automatic line-seizing apparatus for use in a plurality of terminals connected to a single data line.

It is an object of this invention to provide a line-seizing apparatus wherein when one terminal is on the data line, all other terminals are automatically prevented from going on the data line.

It is an object of this invention to provide a line-seizing apparatus wherein when one terminal which is on the line goes off the line, if there is another terminal ready to use the data line, it will automatically come on the line.

It is an object of this invention to provide a line-seizing apparatus which includes tie-breaking circuitry for placing only one terminal on the line when two or more terminals demand use of the line approximtely simultaneously.

It is an object of this invention to provide line-seizing apparatus which includes tie-breaking circuitry for placing only one terminal on the line when two or more terminals demand use of the data line approximately simultaneously, and which is such that all of the units simultaneously demanding use of the data line have approximately the same probability of going on the data line first.

It is an object of this invention to provide line-seizing apparatus capable of easy expansion to add additional terminals to a multiterminal installation without the necessity of changing or modifying the line-seizing apparatus in the terminals already installed.

It is an object of this invention to provide line-seizing apparatus which fulfills each of the above-mentioned objects and is further characterized by simplicity of design, ease of operation, and economy of construction.

Further and additional objects will appear from this specification, the appended claims, and the drawing.

DESCRIPTION OF THE PREFERRED EMBODIMENT

There is disclosed in the drawing a multiple terminal apparatus in which a plurality of remote terminals are connected to a single data processing and recording apparatus over a common data line. The apparatus of the drawing makes use of one exemplary circuit of this invention, and that exemplary circuit will be referred to in this specification as an "anti-contention" circuit. It will be apparent to those skilled in the art that the line-seizing circuit of this invention is useful in many other applications. The overall operation of the apparatus of FIGS. 1 and 2 of the drawing will first be described and the circuit of this invention will then be disclosed in detail.

Figure 1:
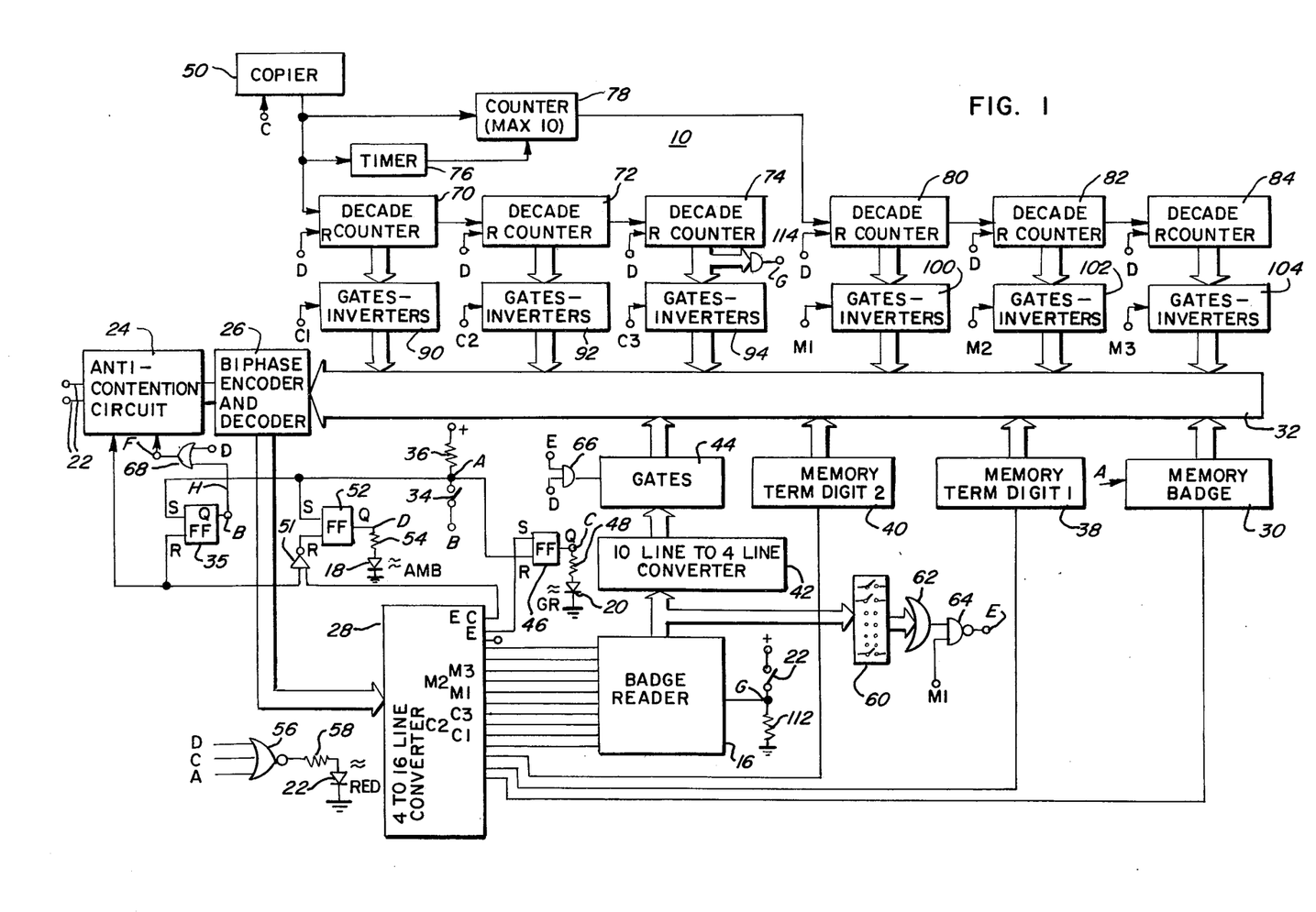
FIG. 1 shows partly in block form and partly in schematic form a single terminal of a multiple terminal apparatus making use of one exemplary circuit of this invention.
Figure 2:
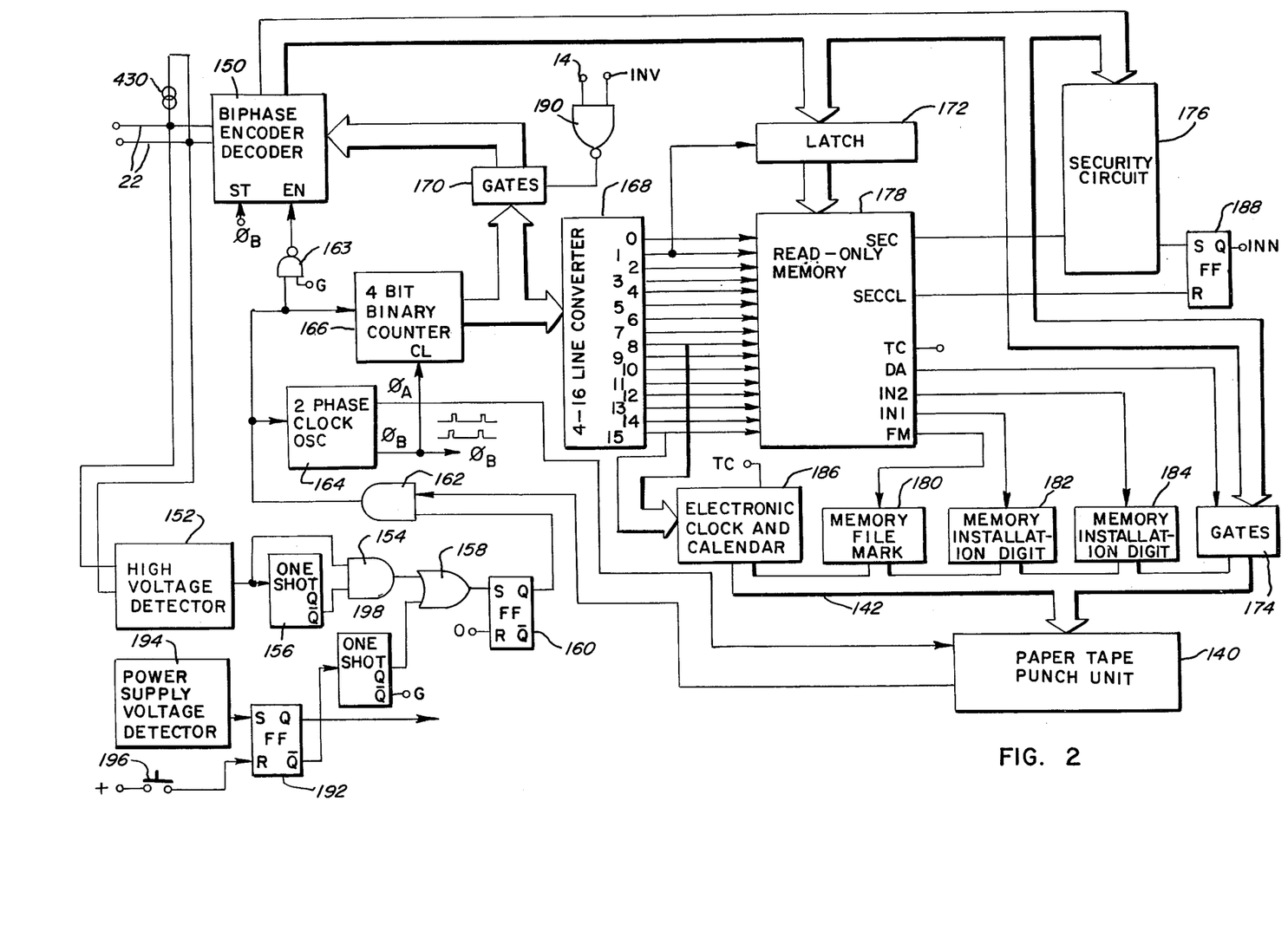
FIG. 2 shows partly in block form and partly in schematic form a central data recording apparatus for use with the terminal of FIG. 1.

There is shown in FIGS. 1 and 2 of the drawing a use monitor and control system particularly adapted for use with photocopier machines. The use monitor and control system is comprised of a terminal unit 10 as disclosed in FIG. 1 and a central recording unit 12 as is disclosed in FIG. 2. One terminal unit 10 is used in association with each photocopy machine to be controlled. In any single usage of the apparatus of this invention it is normal to provide a single central recording unit 12 and a plurality of terminals 10 so that the usage of a like plurality of copiers may be monitored and controlled using a single central recorder.

Figures 3, 6:
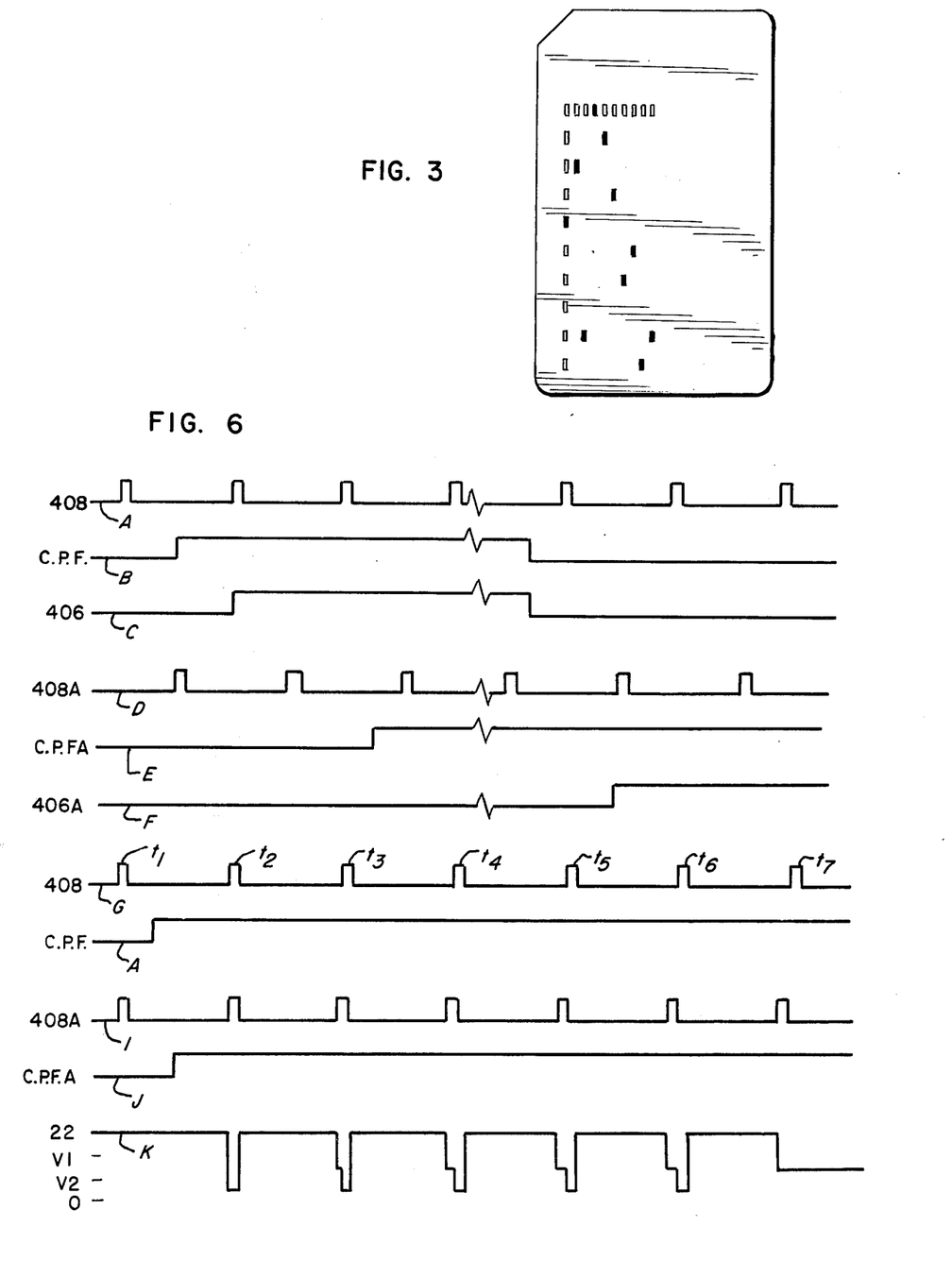
FIG. 3 shows a badge for use with the terminal of FIG. 1.
FIG. 6 is a set of waveforms for explanation of the operation of the circuit of FIG. 5.

The operation of the disclosed apparatus as viewed from the standpoint of a user of the controlled copier will first be explained. Each authorized user is provided with an identification card or badge 14 as is shown in FIG. 3. The badge includes a plurality of punched holes which may be located in a matrix of ten columns of ten rows, the possible matrix positions being indicated by the rectangles shown on the card. A single punched hole is located in each column and represents a decimal number. The numbers encoded on any single user's badge gives identifying information about the user and also provides security against the creation of counterfeit badges. In the system to be described, two columns on the card represent the user's department number, three columns represent a unique number within the user's department used to identify that individual user, one column represents the privilege level of the user, and the remaining four columns provide security. The security numbers may, for example, represent an identification number of the particular system with which the badge is to be used, some mathematical permutation of the remaining numbers on the badge, or a combination of these. The privilege level identification permits the control and monitor system to be arranged so that only certain individuals will be able to use certain ones of the controlled copiers.

Each terminal 10 includes a badge reader 16. When the user wishes to make copies, he places his badge into the badge reader. An amber light 18 located on the panel of terminal 10 is then lighted to inform the user that the terminal is in use and that he should wait until a green light 20 is lighted before attempting to make copies. A communication link between the terminal 10 and the central recorder 12 is then established and the information on the badge is read and transmitted to the central recorder as well as a number indentifying the particular terminal 10. The central recorder 12 records the terminal number, department number, user identification number, and the present date and time of day on punched paper tape. The central recorder 12 also verifies the validity of the information on the badge and additionally verifies that the user is of the proper privilege level to use the associated copier . If the information is valid and the user has the proper privilege level, a signal is sent back to the terminal to enable the copier associated with the terminal, thus permitting the user to make the desired number of copies, and illuminating green light 20. The communication link between the terminal 10 and the central recorder 12 is then terminated. If the information on a badge inserted in the card reader is invalid or the user does not have the proper privilege level, a red light 22 on the terminal panel is illuminated to indicate that the copier will not be enabled. As the user makes his copies, two counts are kept at the terminal. The first represents the total number of copies made by the user and the second is a multiple copy count as will be subsequently explained. When the user finishes making his copies, he momentarily closes a switch 22 located on the terminal panel which causes his badge to be ejected from the badge reader. He may then take his card and leave; green light 20 is extinguished, and the copier is disabled. A communication link between the terminal 10 and central recorder 12 is thenreestablished, and the terminal transmits the terminal number, the total copy count, and the multiple copy count to the central recorder where those numbers are recorded on the punched paper tape. The communication link between terminal 10 and central recorder 12 is then again terminated.

Figure 4:
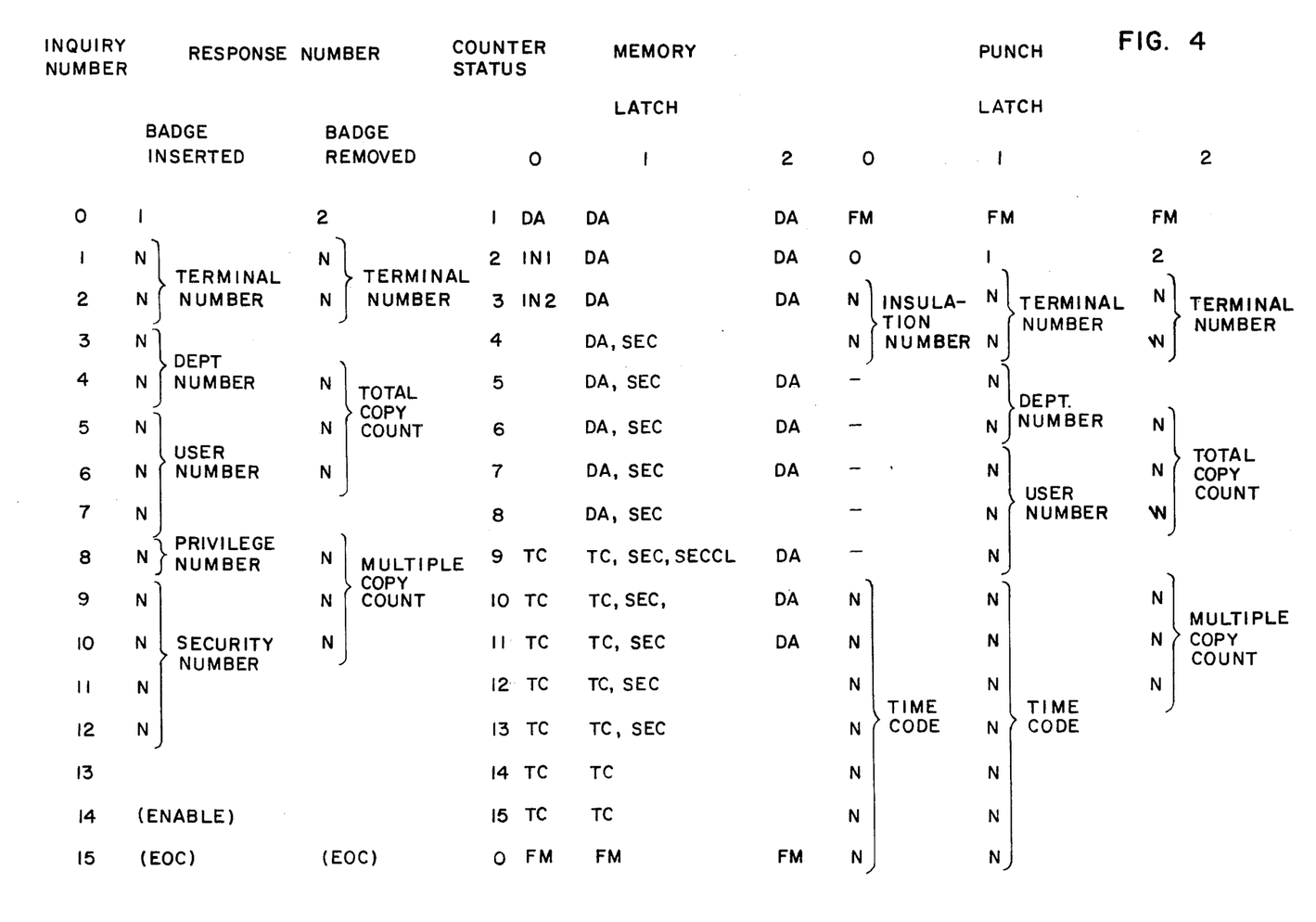
FIG. 4 is a table for explanation of the operation of the apparatus of FIGS. 1 and 2.

The basic operation of the system will be explained with reference to the chart of FIG. 4. The first column thereof represents inquiry numbers transmitted from the recorder to the terminal, the second column represents the response numbers transmitted from the terminal to the recorder when there is a badge in the reader, and the third column represents the response numbers when the badge has been removed from the reader. Thus, when a badge is placed in the reader and communication established between terminal 10 and central recorder 12, central recorder 12 first transmits inquiry number 0 to the terminal. If a badge is in the reader, the terminal responds with a number 1; if the badge has been removed from the reader, the response number is 2. The central recorder then transmits successively inquiry numbers 1 through 15. The responses to inquiry numbers 1 and 2, whether or not a badge is in the reader, are two numbers identifying the particular terminal in use. When a badge is in the reader, the responses to inquiry numbers 3-12 represent the 10 digits on the inserted badge, inquiry numbers 13-15 elicit no response,but inquiry number 14 is a signal to the terminal that operation of its corresponding copier should be enabled, and inquiry number 15 is a signal to the terminal that the communication between the center recorder and the terminal is at an end. When the badge has been removed from the reader, the responses to inquiry numbers 4-6 represent the total copy count, the responses to inquiry numbers 8-10 represent a multiple copy count, inquiry numbers 3, 7, and 11-15 elicit no response, but inquiry number 15 is again a signal to the terminal that the communication between the central recorder and the terminal is at an end.

The terminal 10 of FIG. 1 will first be described. A positive logic level convention will be used throughout this specification with the abbreviations "LL0" and "LL1" meaning "logic level 0" and "logic level 1," respectively. A two-wire data line 22 is provided for coupling terminal 10 the central recorder 12. The data on line 22 is in bi-phase, four bit, serial form. The data on line 22 is coupled through an anti-contention circuit 24 to a bi-phase encoder and decoder circuit 26. The anti-contention circuit is effective to couple line 22 to encoder and decoder 26 at the appropriate times as will be more fully explained subsequently. For the present, it may be assumed that line 22 is directly connected to the circuit 26. The circuit 26 is effective both to convert the bi-phase, four bit srial information present on line 22 into four-bit, parallel information at its output and to convert four bit, parallel information at its input into bi-phase, four bit serial information on line 22. The bi-phase, serial data transmission system is also known as Manchester encoding. It is fully described at *Reference Data for Radio Engineers,* fifth edition, pages 32-21, published by International Telephone & Telegraph, New York, New York. An example of circuit which may be used to perform the functions of circuit 26 is given in Alfke, "Exclusive OR Gates Simplify Modem Designs," *EDN Magazine,* Sept. 15, 1972, page 43.

The output of circuit 26 is in the form of four lines and is applied to the inputs of a 4 to 16 line converter 28. A 0 output of converter 28 is applied to a control input of a memory circuit 30. Memory circuit 30 has outputs coupled to a 4 line data bus 32 coupled to the input of bi-phase encoder and decoder circuit 26. When memory circuit 30 is enabled by application of an LL1 signal to the control input thereof, it is effective to apply a binary 1 to data bus 32 if a badge is inserted in badge reader 16 and a binary 2 to data bus 32 if no badge is inserted in badge reader 16. The badge reader 16 includes a switch symbolically represented at 34 and having one terminal coupled through a resistor 36 to a source of positive potential and the other coupled to the Q output of a set-reset, positive edge triggered flip-flop 35. Switch 34 is closed when a badge is inserted into badge reader 16 and is opened when a badge is removed therefrom. The junction of switch 34 and resistor 36 is labeled as circuit point A and the junction of switch 34 and the Q output of flip-flop 52 is labeled as circuit point B. That circuit point A is coupled to an input of memory 30 and is effective to appropiately control the binary number applied by memory 30 to data bus 32. The 1 and 2 outputs of converter 28 are coupled to control inputs of memory circuits 38 and 40, respectively. Memory circuits 38 and 40 have their outputs coupled to data bus 32 and are effective to apply 4 bit binary numbers to data bus 32 representing the first and second digits, respectively, of a terminal identification number when LL1 signals are applied to the control inputs thereof.

Outputs 3-12 of converter 28 are applied to 10 inputs of the badge reader 16. Outputs 3-5 and 8-10 are labeled C1-C3 and M1-M3, respectively, for reasons which will subsequently become apparent. Badge reader 16 has 10 outputs which are coupled to the inputs of a 10 line to 4 line converter 42. Badge reader 16 is such that when an LL1 signal is applied to the first input thereof, the first column of the badge within the reader is read and an LL1 signal appears at the output thereof corresponding to the row in which a punched hole appears in that first column. The second through tenth columns of the badge are similarly read when LL1 signals are applied to the second through tenth inputs, respectively, of badge reader 16. The converter 42 converts the decimal information at the outputs of badge reader 16 into binary information at its outputs. The outputs of converter 42 are coupled through a set of gates 44 to data bus 32. Gates 44 have a control input such that the outputs of converter 42 are applied to data bus 32 only when an LL1 signal is applied to that control input. The 13 output of converter 28 is not used.

The 14 output of converter circuit 28 is labeled E as an abbreviation for "enable." It is coupled to the set input of a set-reset flip-flop 46. Circuit point A is coupled through an inverter 47 to the reset input of that flip-flop. The Q output of flip-flop 46 is coupled to a circuit point C. The circuit point C is coupled through a resistor 48 to the anode of a green light-emitting diode 20 having its cathode coupled to ground. Circuit point C is also coupled to a control input of a photocopier 50 associated with terminal 10. The photocopier 50 is such that an LL1 signal must be applied to the control input to enable operation of the copier. The 15 output of converter circuit is labeled EOC as an abbreviation for "end-of-communication." It is coupled through an inverter 51 to reset input of set-reset, negative edge triggered flip-flop 52 having its set input coupled to circuit point A. The Q output of flip-flop 52 is coupled to circuit point D which, in turn, is coupled through a resistor 54 to anode of an amber light-emitting diode 18 having its cathode coupled to ground. The 15 output EOC of converter 28 is also coupled to the reset input of flip-flop 35 and circuit point A is coupled to the set input of that flip-flop.

A three input NOR gate 56 is provided having a first input coupled to circuit point A, a second input coupled to circuit point C, a third input coupled to circuit point D, and an output coupled through a resistor 58 to the anode of red light-emitting diode 22 having its cathode coupled to ground. Each of the outputs of badge reader 16 is additionally coupled through one switch in an array of switches shown diagrammatically at 60 to the inputs of an OR gate 62. The output of OR gate 62 is coupled to a first input of a two input NAND gate 64 having its second input coupled to the 8 output M1 of converter 28. The output of NAND gate 64 is coupled to circuit point E which, in turn, is coupled to a first input of a two input AND gate 66 having its second input coupled to circuit point D and its output coupled to the control input of gates 44. Circuit points B and D are coupled to two inputs of an OR gate 68. The output of OR gate 68 is coupled to circuit point F. Circuit point F is coupled to a first control input of anti-contention circuit 24 and the 15 output EOC of converter 28 is coupled to the second input thereof. As will be explained subsequently, an LL1 signal at the first control input of the anti-contention circuit causes the creation of a communication link between the terminal and the central recorder and an LL1 signal at the second input thereof causes the termination of that communication link.

The circuitry of FIG. 1 as thus far described is operative to provide the operation previously described with reference to the second column of FIG. 4. Prior to the time a badge is first inserted into badge reader 16, flip-flop 35 is reset and circuit point B is at LL0. When a badge is inserted into badge reader 16 and switch 34 closed, flip-flop 52 is set, circuit point D is placed at LL1, and amber light-emitting diode 18 is illuminated. When circuit point D goes to LL1, an LL1 signal to the first control input of anti-contention circuit 24 and a communication link with the central recorder is established. When inquirey numbers 0–12 are successively received on data line 22, LL1 signals are successively generated at outputs 0–12 of converter 28,. The LL1 signals at converter outputs 0–2 cause memories 30, 38, and 40 to apply their respective response numbers to data bus 32. Further, since circuit point D is at LL1, when circuit point E is also at LL1, and LL1 signal is applied to the control inputs of gates 44 so that the outputs of converter 42 are coupled to data bus 32 and the LL1 signals at converter outputs 3–13 cause the numbers on the inserted badge to be successively applied to data bus 32. When an inquiry number 14 is received, an LL1 pulse is generated at the 14 output E of converter 28 setting flip-flop 46. With flip-flop 46 set, circuit point C is at LL1, copier 50 is enabled, and green light-emitting diode 20 is illuminated. The user may then make the desired number of copies. Receipt of inquiry number 15 causes an LL1 pulse to be generated at the 15 output of converter 28 which is effective to reset flip-flop 52 extinguishing amber light-emitting diode 18 and which is also applied to the second control input of anti-contention circuit 24, thus terminating the communication link with the central recorder. It should be noted that red light-emitting diode 22 is not illuminated unless inquirey number 15 is received without the prior receipt of an inquiry number 14 as only then will each of circuit points A, C, and D simultaneously be at LL0.

Copier 50 includes an output at which is generated an LL1 pulse every time a copy is made thereon. That output is coupled to the counting input of the first one of a chain of three decade counters 70, 72, and 74. That output of copier 50 is also couled to inputs of a timer circuit 76 and a counter 78. Timer 78 is such that its output is at LL0 unless its input has been at LL0 for a predetermined period of time, in which case at the end of that period an LL1 pulse is generated at an output. Counter 78 is such that it counts to a maximum count of 10; when that count is reached, an LL1 pulse is gnerated at its output and the coutner no longer counts the pulses applied thereto. The output of timer 76 is coupled to a reset input of counter 78 and is effective to reset counter 78 to zero. The output of counter 78 is coupled to the counting input of the first one of a chain of three decade counters 80, 82, and 84. The outputs of decade counters 70, 72, 74, 80, 82, and 84 are coupled through gate-inverters sets 90, 92, 94, 100, 102, and 104 to data bus 32. Each of the gate-inverter sets 90, 92, 94, 100, 102, and 104 includes a control input. They are each such that when an LL1 signal is applied to its control inputs, the counts present on its associated decade counter is inverted and applied to data bus 32. Each of decade counters 70, 72, 74, 80, 82, and 84 has a reset input such that when an LL1 signal is applied thereto, the counter is reset to zero. Those reset inputs are coupled to circuit point D.

Badge reader 16 has a badge eject input. If an LL1 signal is applied to it, the badge within the reader is ejected. The badge eject input is coupled to a circuit point G which, in turn, is coupled throug switch 22 to a source of positive potential and through a resistor 112 to ground. The outputs of decade counter 74 representing binary counts 1 and 8 are coupled individually to the two inputs of a two input AND gate 114. The output of gate 114 is coupled to circuit point G. The 1–6 and 8–10 outputs of converter 28 are coupled to the control inputs of gate-inverter sets 90, 92, 94, 100, 102, and 104, respectively.

It will be apparent that decade counters 70, 72, and 74 count the total number of copies made on copier 50 during any one user's operation thereof. Decade counters 80, 82, and 84 form a count related to the number of multiple copies made from a single original. Specifically, the count contained in decade counters 80, 82, and 84 is advanced by one every time ten copies or more are made from a single original. Timer 76 is set so that counter 78 will be reset after a predetermined interval of time following the making of the last copy has elapsed. The length of that interval is substantially longer than that between operating cycles of copier 50 when it is making multiple copies from a single original but substantially shorter than that required for the original material in copier 50 to be changed.

When the user of copier 50 has completed making his copies, he momentarily closes switch 22 and his card is ejected. Switch 34 is then opened, flip-flop 46 is reset, and green light-emitting diode 20 is extinguished. Further, flip-flop 35 is set and an LL1 signal is applied through OR gate 68 to the first control input of anti-contention circuit 24 establishing a communication link with the central recorder. When inquiry numbers 0–2 are then received, memories 30, 38, and 34 apply their appropriate binary numbers to data bus 32. Further, when inquiry numbers 4–6 and 8–10 are received, the counts contained in decade counters 70, 72, 74, 80, 82, and 84 are successively applied to data bus 32 through their associated gate-inverter sets. When inquiry number 15 is received, flip-flop 35 is reset and an LL1 pulse is applied to the second control input of anti-contention circuit 24 terminating the communication link with the central recorder. When a badge is next inserted into reader 16, flip-flop 52 will again be reset and the resultant LL1 signal at its output will cause counters 70, 72, 74, 80, 82, and 84 to be reset to zero. It should be noted that with the counters thus reset, the gate-inverter sets 90, 92, 94, 100, 102, and 104 are operative to apply LL1 signals at all their outputs to data bus 32 when a badge is inserted in badge reader 16. Thus, when the badge numbers are read onto data bus 32, the outputs of gates 44 may still pull the appropriate lines of data bus 32 down to LL0. The counts in counters 70, 72, 74, 80, 82, and 84 will be inverted before they are applied to data bus 32. If it should happen that a badge is inserted into badge reader 16 prior to the counts in all of counters 70, 72, 74, 80, 82, and 84 being transmitted to the central recorder, i.e., prior to the receipt of inquiry number 15, then flip-flop 35 will remain set and the LL1 signal at its output will prevent circuit point A from going to LL0, thus preventing flip-flop 52 from being set and the count in the decade counters from being erased until after all the information is transmitted to the central recorder.

AND gate 114 prevents overflow of counters 70, 72, and 74. Without it, if more than 999 copies were made, the counts in those counters would go to zero, the terminal would not record the making of the previous copies. However, the output of AND gate 114 goes to LL1 when the 900th copy is made which causes the badge within badge reader 16 to be ejected. The data contained within the terminal 10 is then recorded by the central recorder and the user may then reinsert his badge to commence making further copies. It will be apparent that although only provisions for counting and recording only six decimal digits are shown in the terminal of FIG. 1, it could easily be expanded to include four more digits.

Elements 60–66 provide the privilege level feature previously referred to. The output of NAND gate 64 will normally be at LL1 thus enabling the operation of gates 44 as previously described. If, however, the output of OR gate 62 is at LL1 at the same time the sixth column of the badge 14 is being read by the badge reader, then the output of gate 64 will be at LL0 and gates 44 will prevent the transmission of the privilege level digit to the central recorder. The switches in switch array 60 may be set so that only certain privilege levels will result in transmission of the privilege level digit to the central recorder. If it is desired that any particular privilege digit be prevented from operating the copier 50 associated with terminal 10, it is merely necessary to close the switch in array 60 coupling the corresponding output of badge reader 16 to the OR gate 62. As mentioned, the security numbers on the badge 14 may represent a mathematical permutation of the remaining numbers on the badge. When this is so, if the transmission of the privilege level digit is suppressed, then the circuitry at the central recorder for performing that permutation will not receive one digit, the permutation will give an incorrect result, the central recorder will respond as though the badge contained invalid data, and the corresponding copier will not be enabled. Thus, terminal 10 may be programmed so that it will not enable the associated copier 50 when the user's badge contains any selected privilege level numbers merely by closing the switches in array 60 corresponding to those numbers.

A central recorder 12 is disclosed in FIG. 2. The central recorder 12 includes a paper tape punch and associated circuitry 140. Unit 140 has inputs coupled to a data bus 142 and a control input. When a positive going signal is applied to its control input, unit 140 is effective to transfer the information on bus 142 into the unit, encode the transferred information into a form suitable for recording on punched paper, and recording that information. The unit 140 includes an output which is normally at LL1, but goes to LL0 when unit 140 is enabled by the application of a positive going signal to the control input thereof and remains at LL1 until sufficient time has elapsed for the information on data bus 142 to be recorded.

Central recorder 12 further includes a bi-phase encoder and decoder circuit 150 which is coupled to data line 22 and is similar to the circuit 26 in terminal 10. The circuit 150 is effective both to convert the bi-phase, four bit serial information present on line 22 into four bit, parallel information at its output and to convert the four bit, parallel information at its input into bi-phase, four bit serial information on line 22. The circuit 150 additionally includes first and second control inputs labeled EN and ST, respectively, in FIG. 2. In order for the circuit 150 to be operative, an LL0 signal must first be applied to first control input EN to enable the operation thereof and a positive going signal must be applied to second control input ST in order to start its operation. Removal of the LL1 signal from the first control input EN will then disable circuit 150. The data line 22 is additionally coupled to the input of a relatively high voltage threshold detector circuit 152. That circuit has an output which is at LL1 only when the voltage across data line 22 is below a predetermined, relatively high, first voltage level. The magnitude of that first voltage level will become apparent from the subsequent description. The output of voltage detector 152 is applied to a first input of a two input AND gate 154 and to the input of a one-shot multivibrator circuit 156. An output $\overline{Q}$ of circuit 156 is coupled to the second input of AND gate 154. Circuit 156 is such that its $\overline{Q}$ output is normally at LL0, but when an LL1 signal is applied to the input, the $\overline{Q}$ output goes to LL1 for a predetermined period of time. The output of AND gate 154 is coupled to an input of an OR gate 156 having its output coupled to the set input of a set-reset flip-flop 160.

The Q output of flip-flop 160 is coupled to a first input of a two-input AND gate 162. The output of AND gate 162 is coupled to the first input of a two input NAND gate 163 having its output coupled to the first control input EN of bi-phase encoder and decoder circuit 150. The second input of AND gate 162 is coupled to the output of paper tape punch unit 140. The output of AND gate 162 is also coupled to control inputs of a two phase clock oscillator 164 and a four bit binary counter 166. Oscillator 164 has two outputs labeled $\phi A$ and $\phi B$ in FIG. 2. When an LL1 signal is applied to its control input, it emits a series of LL1 pulses at output $\phi A$ and a similar series of pulses at output $\phi B$, the pulses at output $\phi B$ slightly lagging those at output $\phi A$. Output $\phi A$ of oscillator 164 is coupled to the control input of paper tape punch unit 140. Counter 166 is such that when an LL1 signal is applied to its control input, it is effective to count the pulses applied to a counting input CL thereof, the state of the counter advancing on a negative going signal. The output $\phi B$ of oscillator 164 is coupled to the input CL of counter 166 so that the state of counter 166 is advanced on the trailing edge of the LL1 pulses in the $\phi B$ output of oscillator 164. The outputs of counter 166 are coupled both to the inputs of a 4 to 16 line converter 168 and through a set of gates 170 to the input of bi-phase encoder and decoder circuit 150. Gates 170 include a control input which is such that when an LL1 signal is applied thereto, the count present in counter 166 is applied to the input of circuit 150.

The apparatus of central recorder 12 as thus far described provides means for generating inquiry numbers of 0–13 and 15 and applying them to data line 22. In order for central recorder 12 to be operative, flip-flop 160 must be set. With that flip-flop set and the output of unit 140 at LL1, the bi-phase encoder and decoder circuit 150, oscillator 164, and counter 166 are enabled. Oscillator 165 then generate an LL1 signal at its output $\phi A$ which causes unit 140 to record the data then present on data bus 142, the output of unit 140 to go low, and oscillator 164 to be disabled. Immediately following the generation of the LL1 pulse at output $\phi A$, a similar pulse is generated at the output $\phi B$. On the leading edge of that pulse, the operation of bi-phase encoder and decoder circuit 150 is commenced; on the trailing edge of that pulse, the count in counter 166 is advanced by one. The output of unit 140 remains at LL0 for a predetermined period of time. During that period three things are occurring. First, the data formerly present on data bus 42 is recorded by unit 140. Second, the data present at the input of the circuit 150 is converted into serial form and transmitted over data line 22 as an inquiry number. Third, data received on data line 22, the response number, is then generated at the output of circuit 150. After paper tape punch unit 140 has completed its recording operation, its otput goes to LL1, the operation of oscillator 164 is again enabled, and the process is repeated. It should be noted that the period of time required for unit 140 to record the information at its input is longer than the period of time required for the bi-phase encoder and decoder circuit 150 to transmit an inquiry number to a terminal 10 and receive back a response number. Further, it should be noted that during intervals between successive LL1 pulses at output $\phi A$, the apparatus of the central recorder is recording data which is already present on data bus 142 but is inquiring of and receiving from a terminal 10 other data.

The apparatus for applying data to data bus 142 will now be described. The output of bi-phase encoder and decoder circuit 150 is applied to the inputs of a latch circuit 172, a set of gates 174, and a security circuit 176. Latch circuit 172 includes a control input. When the control input is at LL1, latch circuit 172 is effective to transfer the data at its inputs to its outputs, but when the control input is at LL0, it maintains the outputs at the states they had when the control input last changed to LL0. Four to 16 line converter 168 includes 16 outputs labeled 0–15, output 1 thereof being coupled to the control input of latch circuit 172. The 16 outputs of 4 to 16 line converter 168 and the outputs of latch circuit 172 are applied to inputs of a read only memory 178. Read only memory 178 includes seven outputs labeled SEC, SECCL, TC, DA, IN1, IN2, and FM in FIG. 2, those symbols being abbreviations for "security," "security-clear," "time code," "data," "installation digit 1," "installation digit 2," and "file marker," respectively. In the fourth column of FIG. 4 are shown the sixteen possible states of counter 166 while in the fifth through the seventh columns are indicated which of the outputs of memory 178 are at LL1 when the counter is in the corresponding state and depending on whether the output of latch circuit 172 is representative of a binary 0, 1, or 2.

The gates 174 have their outputs coupled to the data bus 142 and are such that when an LL1 signal is applied to a control input thereof, the signals at the output of the bi-phase encoder and decoder circuit 150 are applied to the data bus 142. The control input of gates 174 is coupled to the DA output of memory 178. Three further memories 180, 182, and 184 are also provided and each includes a control input and is such that when an LL1 signal is applied to its respective control input, a digit represented in binary form is applied to data line 142. The digit stored in memory 180 is a number representing a file marker which is to be recorded by the paper tape punch unit each time data is recorded thereby. The control input of memory 180 is coupled to the FM output of memory 178. The digits stored in memories 182 and 184 comprise a number representing an identification and number assigned to a particular installation of a monitoring and control system. A single installation might have more than one central recorder and, thus, more than one central recorder might be assigned the same identification number. The control inputs of memories 182 and 184 are coupled to the outputs IN1 and IN2 of memory 178, respectively. An electronic clock and calendar 186 is provided which is capable of generating a seven digit, binary coded decimal number representing the current date and time. It includes a control input and, when an LL1 signal is applied to the control input thereof, a selected one of those seven digits is produced at the outputs, the identity of the selected digit being controlled by the input signals applied to seven address inputs of the clock and calendar 186. Those address inputs are coupled to outputs 8–15 of 4 to 16 line converter 168. The control input of clock and calendar 186 is coupled to the TC output of memory 178 and the outputs thereof are coupled to data bus 142.

Security circuit 176 includes appropriate apparatus for providing a security check on the data applied thereto. As mentioned previously, the badge 14 includes four digits which may be used in the security system. Security circuit 168 has a control input and when the circuit is enabled by application of an LL1 signal to that control input, the circuit is effective to perform the operations on the security digits and any other of the badge digits required for operation of the security system. Security circuit 176 may also be coupled to the outputs of clock 164 and converter 168 to provide proper timing signals for the operation thereof. The security circuit 176 may be of a variety of configurations depending upon the particular security system being used. As previously mentioned, the privilege level system of the apparatus described includes a security system which performs a mathematical permutation of all the digits on the badge. Thus, if the central recorder does not receive the privilege level digit, a correct result of the permutation is not achieved and the cental recorder responds just as it would if the badge were invalid. In the circuit shown in FIG. 2, the security circuit 176 operates on all 10 digits contained on badge 14.

The control input of security 176 is coupled to the SEC output of memory 178. An output of security circuit 176 is normally at LL0 but when an invalid card is detected, that output changes to LL1. The output of security circuit 176 is coupled to the set input of a set-reset flip-flop 188. The reset input of the flip-flop is coupled to the SECCL output of memory 178. The Q output of flip-flop 188 is coupled to a first input of an NAND gate 190 while the 14 output of converter 168 is coupled to a second input of that NAND gate. The output of NAND gate 190 is coupled to the control input of gates 170.

The operation of central recorder 12 may be further described with reference to FIG. 2. In the fourth column of that figure is shown the state of counter 166 while the inquiry number indicated in the first column is being transmitted to the terminal 10 and the corresponding data is received from the terminal. Thus, while inquiry number 0 is being transmitted to the terminal and either the digit 1 or 2 received from the terminal depending on whether or not there is a badge inserted in the badge reader, counter 168 is in a state representing count 1. In the ninth and tenth columns of FIG. 4 are stated the information which is recorded by the paper tape punch unit 140 during the corresponding counts of counter 166, the ninth column indicating the information recorded when the outputs of latch circuit 172 represent the digit 1 and the tenth column indicating the information recorded when the outputs of latch circuit 172 represent the digit 2.

Prior to the commencement of a communication with any terminal 10, counter 166 is at state 0 and memory 180 is enabled placing a binary number representative of a file mark on data bus 142. At the commencement of a communication, flip-flop 160 is set, and assuming the output of paper tape punch unit 140 is at LL1, oscillator 164 is enabled. An LL1 pulse is then generated at the φA output of oscillator 164 which causes paper tape punch unit 140 to record a file marker. Immediately thereafter an LL1 pulse is generated at the φB output of oscillator 164. The leading edge of that pulse causes the 0 count at the output of counter 164 to be transmitted to terminal 10 and the trailing edge causes the count in counter 164 to advance to 1. During the period that paper tape punch unit 140 is operative to record the file mark, its output is at LL0 and oscillator 164 is thus disabled. While counter 164 is in its 1 state, paper tape punch unit 140 completes the recording of the file mark and the response to inquiry number 0 is received, that response being either a 1 or 2 dependent upon whether a badge is inserted in the card reader of the terminal. While the counter 164 is in its 1 state, output DA of memory 178 is at LL1, gates 174 are enabled, and the response to inquiry number 0 is applied therethrough to data bus 142. Further, while the counter 164 is in its 1 state, output 1 of converter 168 is at LL1 so that the response to inquiry number 0 appears at the output of latch circuit 172.

After the paper tape punch unit 140 has completed recording the file mark, its output goes to LL1, oscillator 164 is again enabled and successive LL1 pulses again appear at its outputs φA and φB. The φA pulse causes the paper tape punch unit 140 to commence recording the information on data bus 142, i.e., the response to inquiry number 0, the leading edge of the φB pulse causes the 1 output of counter 166 to be transmitted to terminal 10, and the trailing edge of φB pulse causes the count in counter 166 to advance to 2. While the counter 164 is in its 2 state, the paper tape punch unit 140 completes the recording of the response to inquiry number 0 and the response to inquiry number 1 is received, that response being the first digit of the terminal identification number. While the counter 164 is in its 2 state, output of latch circuit 172 remains at the state determined by the response to inquiry number 0 and the output DA of memory 178 is at LL1, gates 174 are enabled, and the response to inquiry number 1 is applied therethrough to data bus 142.

After the paper tape punch unit 140 has completed recording the response to inquiry number 0, the process is repeated and the paper tape punch unit 140 records the response to inquiry number 1 and inquiry number 2 is sent to the terminal 10 and the response thereto received and applied to data bus 142. When the output of latch circuit 172 is at 1, this process is repeated when the counter 168 is in states 3–8. While the counter is in states 4–8, the response to inquiry numbers 3–7 are received indicating the department number and user number represented on the badge inserted into the badge reader. While the counter is in states 5–9, the response to inquiry numbers 3–7 are recorded by the paper tape punch unit 140. When counter 166 is in states 9–14 the digits representing the badge priority and security numbers are received. There is normally no need for the paper tape punch unit to record those numbers. Instead, the clock and calendar unit 186 provides a time code representing the present date and time. Output TC of memory 178 is at LL1 when counter 166 is in states 9–15 and the seven digits in the output of clock and calendar unit 186 are accordingly recorded when counter 166 is in states 10–15 and 0.

Still considering the situation when the output of latch circuit 172 is at 1, output SEC of memory 178 is at LL1 when counter 166 is in states 4–13. Thus, the digits received from terminal 10 while the counter is in states 4–13, i.e., all the digits read from the badge, are applied to security circuit 176. If the output of security circuit 176 goes to LL1 indicating an invalid badge has been used, then the central recorder must not transmit inquiry number 14 to the terminal. Elements 188 and 190 provide this function. Normally the Q output of flip-flop 188 is at LL0. Thus, an LL1 signal is generated at the output of NAND gate 190 and applied to the control inputs of gates 170 so that the output of counter 166 is applied to the input of bi-phase encoder and decoder circuit 150. When data representing an invalid badge is received, the output of security circuit 176 goes to LL1 setting flip-flop 188 and placing its Q output at LL1. In this situation, when the output 14 of of counter 166 is at LL1, the output of NAND gate 190 is at LL0 and gates 170 are disabled disconnecting the output of counter 166 from the input of circuit 150 and preventing transmission of inquiry number 14. Following flip-flop 188 being set, it is necessary to reset that flip-flop when the time information read from another badge is received. This is achieved by providing output SECCL from memory 178 which is at LLI1 when counter 166 is in state 9 and coupling it to the reset input of flip-flop 188.

In order to terminate the operation of the central recorder after all the information from the badge has been received and the complete time code recorded, the 0 output of converter 168 is coupled to the reset input of flip-flop 160. When counter 166 is advanced through all of counts 1–15 and returns to 0, inquiry number 15 is then transmitted to the terminal and memory 180 is enabled to permit the recording of a file mark the next time a communication with a terminal is commenced. In summary, when a badge is inserted in the badge reader, the paper tape punch unit 140 is effective to record a file mark followed by the digit 1, five digits identifying the user, and seven digits stating the date and time.

When the output of latch circuit 172 is at 2, the operation of the central recorder is similar to that described in the three immediately preceeding paragraphs, except the time code is not recorded and the security circuit 176 is not enabled. Instead, the total copy count digits and the multiple copy count digits received from the terminal are recorded. In this case, the paper tape punch unit 140 records a file mark followed by the digit 2, three digits representing the total copy count, and three digits representing the multiple copy count.

The central recorder 12 also includes apparatus for recording a two digit installation identification number and the date and time every time its operation is initiated. That apparatus includes a set-reset flip-flop 192 having its set input coupled to the output of a power supply voltage detector 194 and its reset input coupled through a switch 196 to a source of positive voltage. Power supply voltage detector 194 is coupled to the circuitry for supplying power to the central recorder and its output is at LL0 when the power supply output voltage is below that required to operate the central recorder and is otherwise at LL1. Switch 196 is located on the front panel of the central recorder and must be temporarily closed every time the operation of the central recorder is commenced, i.e., either when power is applied thereto or after the paper tape supply in paper tape punch unit 140 has been replenished. The Q output of flip-flop 192 is applied to the reset inputs of flip-flops 160 and 188, insuring that both those flip-flops are initially reset when power is applied to the central recorder, and to a clear input of counter 166, resetting that counter to 0 when power is applied to the central recorder. The $\overline{Q}$ output of flip-flop 192 is coupled to the input of a single-shot multivibrator 198. The Q output of single-shot multivibrator 198 is applied to the second input of OR gate 158 and is normally at LL0 except during a period of time of predetermined length following the application of an LL1 signal to its input. The $\overline{Q}$ output of single-shot multivibrator 198 is coupled to a circuit point G which, in turn, is coupled to the second input of NAND gate 163. Each time switch 196 is closed, the one-shot multivibrator applies an LL1 signal through gate 158 to the set input of flip-flop 160. An LL0 signal is correspondingly applied from the one-shot multivibrator to the second input of NAND gate 163 so that an LL1 signal is applied to the second control input EN of bi-phase encoder and decoder circuit 150 disabling the operation thereof. With flip-flop 160 set, the central recorder starts to operate. However, since circuit 150 is disabled, no inquiry numbers are sent to the terminals and no responses are received therefrom. Thus, the output of latch circuit 172 is maintained at 0. The states of the outputs of the memory 178 and the numbers recorded by paper tape punch unit 140 in this situation are represented in the fifth and eighth columns of FIG. 4, respectively. While counter 166 is in states 1 and 2, a file mark and the digit 0 are recorded. When counter 166 is in states 2 and 3, outputs IN1 and IN2, respectively, of memory 178 are at LL1 and memories 182 and 184, respectively, are enabled thereby so that signals representative of the first and second installation identification digits, respectively, are applied to data bus 142. When counter 166 is in states 3 and 4, first and second installation identification digits, respectively, are recorded. When counter 166 is in states 10-15 and 0, the seven digit time code is recorded. The period of one-shot multivibrator 198 should be slightly longer than the time required for the paper tape punch unit 140 to record the file mark. Thus, whenever the operation of central recorder 12 is initiated by closing of switch 196, the paper tape punch unit 140 records a file mark, the digit 0, a two digit number identifying the central recorder installation number, and a seven digit code representing the date and time.

As previously mentioned, and in accord with this invention, terminal 10 includes anti-contention circuit 24. The purpose of that circuit is to permit the use of one central recorder to control and monitor the use of a plurality of copiers with each copier having a terminal 10 associated therewith. Specifically, it proivides that a single, two-wire data line 22 may be used to couple all the terminals associated with a single central recorder to that recorder, the separate terminals being connected in parallel across the line, and insures that only one termianl will communicate with the central recorder at one time.

Figure 5:
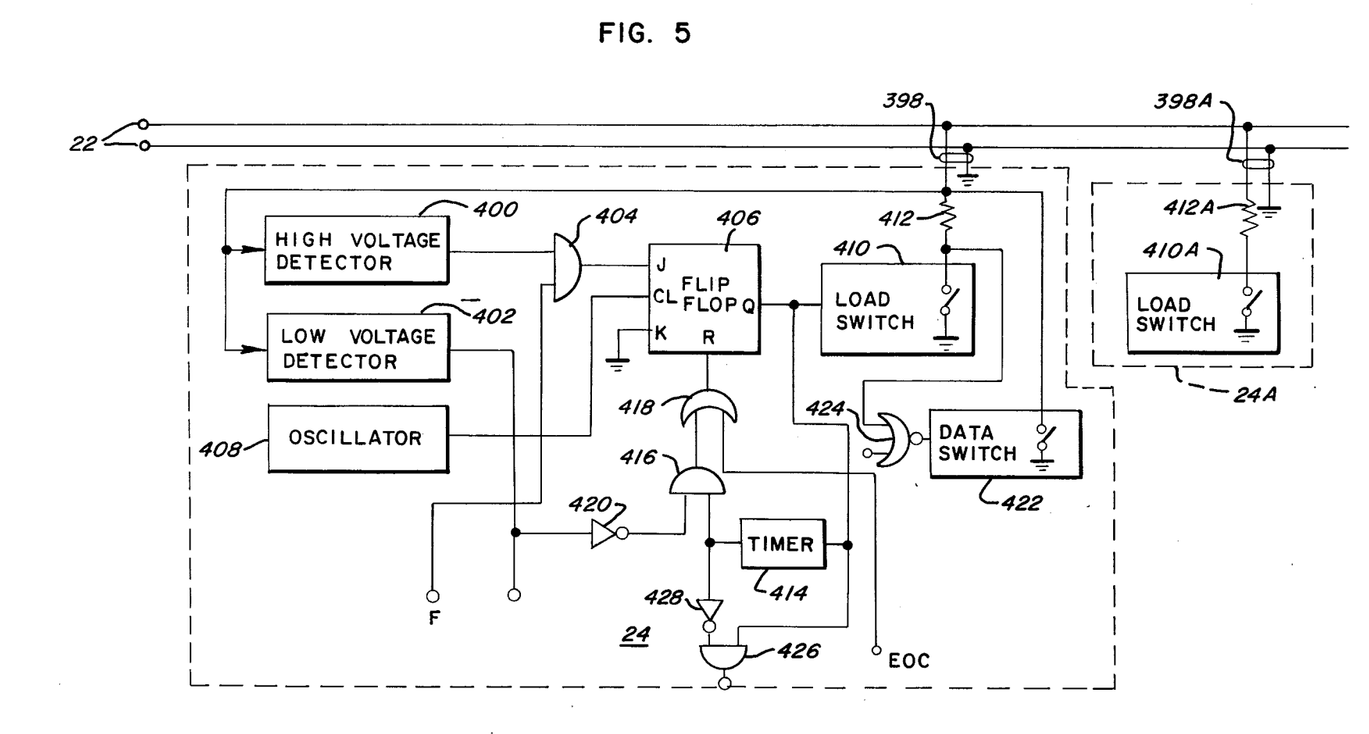
FIG. 5 shows partly in block form and partly in schematic form the exemplary circuit of this invention included in the terminal of FIG. 1.

The anti-contention circuit will be described with reference to FIG. 5. Each terminal 10 associated with central recorder 12 includes an anti-contention circuit 24 coupled through an appropriate connecting means 398 to the data line 22. A first anti-contention circuit 24 associated with a first terminal 10 is disclosed in FIG. 5 while a second anti-contention circuit 24A associated with a second terminal 10A is partially shown. Circuits 24 and 24A may be virtually identical. One side of data line 22 is coupled to circuit ground while the other side is coupled to an input of a relatively high voltage threshold detector 400 and an input of a relatively low voltage threshold detector 402. The output of threshold detector 400 is at LL1 when the voltage across data line 22 exceeds a first voltage level and is otherwise at LL0, whereas the output of threshold detector 402 is at LL1 when the voltage across data line 22 exceeds a second voltage level and is otherwise at LL0, the first voltage level being greater than the second. The output of voltage detector 400 is coupled to a first input of a two-input AND gate 404. A J-K flip-flop 406 is provided having its J input coupled to the output of gate 404, its K input coupled to ground, and its clock input coupled to the output of an oscillator 408. The Q output of flip-flop 406 is coupled to a load switch 410 having an output coupled through a resistor 412 to the ungrounded side of data line 22. Load switch 410 is effective to couple the ungrounded side of data line 22 to ground through resistor 412 when an LL1 signal is present at its input,. The Q output of flip-flop 406 is also coupled to the input of a timer circuit 414. An output of timer 414 is normally at LL1 but goes to LL0 when the signal at its input has been at LL1 for a predetermined interval of time. The output of timer 414 is coupled to the first input of a two-input AND gate 416 and the output of that gate is coupled to a first input of a two-input OR gate 418. The output of voltage detector 402 is coupled through an inverter 420 to the second input of AND gate 416. The second input of OR gate 418 is coupled to the 15 output EOC of converter 28 in terminal 10. The second input of AND gate 404 is coupled to circuit point F in terminal 10. As metnioned, anti-contention circuit 24A is similar to circuit 24 and, specifically, includes a load switch 410A and a resistor 412A connected just as are the corresponding elements in circuit 24. However, the oscillator in circuit 24A corresponding to oscillator 408 in circuit 24 operates at a slightly different frequency than oscillator 408. The central recorder 12 includes a current source 430 coupled between data lines 22. That current source and elements 152, 154, and 156 in the central recorder 12 cooperate with the anti-contention circuit 24 to perform the desired function.

Data is transmitted over data line 22 by 0 volt pulses. The anti-contention circuit 24 also includes a data switch represented at 422 and coupled between the nongrounded side of data line 22 and ground. When an LL1 signal is applied to an input thereof, the data switch is closed causing a 0 volt signal to appear across the data line. The input of data switch is coupled to the output of a two input NOR gate 424 having a first input coupled to the junction of load switch 410 and resistor 412. The date to be transmitted is applied from the bi-phase encoder and decoder circuit 26 to the second input of NOR gate 424, whereas the data received is applied from the output of relatively low voltage detector 402 to the bi-phase encoder and decoder circuit 26.

In brief, the anti-contention circuits operate as follows. The current source 430 within central recorder 12 provides a relatively fixed current flow between the side of data line 22 so that, at least when no data is being transmitted over the data line, the voltage between the two sides is a function of the resistance between them. When communication between any terminal 10 and the central recorder 12 is established, the corresponding load switch 410 in that terminal is closed and the associated resistor 412 is placed across the data line 22. When the load switches 410 in each terminal 10 associated with a single central recorder are open, the voltage across data line 22 will be at a high, open circuit voltage determined primarily by the internal resistance of the current generator 430. When the switch 410 associated with one of the terminals is closed, the presence of the resistor 412 across the data line causes the voltage thereacross to fall below a first voltage level. Relatively high voltage threshold detector 400 detects whether the voltage across the data line is above or below that first voltage level. If the load switches 410 associated with two or more terminals should ever be closed at the same time, two or more resistors 412 are thereby placed across data line 22 causing the voltage to fall below a second voltage level lower than the first voltage level. Relatively low voltage threshold detector 402 detects whether the voltage across the data line is above or below the second voltage. When the output of detector 400 is at LL1, the terminal is permitted to establish a communication link with the central recorder and the load switch 410 is closed. When the output of detector 400 is at LL0, another terminal has already established a communication link with the central reocrder and terminal 10 is not permitted to establish such a communication link until the previously establihsed link is terminated. If it should happen that load switches 410 and 410A of both terminals 10 and 10A are closed, then the voltage across data line 22 will fall below the second voltage level. Voltage detector 22 detects the occurrence of this condition and terminates the communication links between both of terminals 10 and 10A and the central recorder. A pseudorandom system making use of oscillator 408 in the terminals is then used to establish a communication link with one of the terminals.

In greater detail, when a badge is inserted into badge reader 16 and switch 34 is closed, flip-flop 52 is set, and circuit point F is placed at LL1. If the output of voltage detector 400 is at LL1, flip-flop 406 is then set at the next time a pulse is applied to its clock input from oscillator 408 and load switch 410 is closed. An LL0 signal is then applied to the first input of NOR gate 424 and data switch 422 is opened and closed in response to the signal present at the second input of that gate, thus establishing a communication link between terminal 10 and the central recorder. If, on the other hand, the output of voltage detector 400 is at LL0, no such communication link is established until that output changes to LL1 when any previously established communication link with another terminal has been terminated. Similarly, when a badge is removed from badge reader 16, switch 34 is opened, flip-flop 35 is set, and circuit point F goes to LL1. If the output of voltage detector 400 is at LL1, flip-flop 406 is set and load switch 410 is closed establishing a communication link with the central recorder 12. If the output of voltage detector 400 is at LL0, no communication link is established until is changes to LL1. When inquiry number 15 is received by the terminal indicating the end of a communication, an LL1 signal is applied from the EOC output 15 of converter 28 to the reset input of flip-flop 406 causing load switch 410 to open and terminating the communication link with the central recorder.

In FIG. 6 there are shown exemplary waveforms for purposes of further explanation of the operation of the anti-contention circuit. Waveform A represents the output of oscillator 408, waveform B the signal at circuit point F when it is desired to establish a communication link between terminal 10 and the central recorder 12, and waveform C represents the output of flip-flop 406. Waveforms D, E, and F correspond to waveforms A, B, and C, respectively, but represent the signals present in anti-contention circuit 24A. As may be seen from comparing waveforms B and E, the signal at circuit point F in circuit 24 goes to LL1 prior to the signal at the corresponding circuit point F in circuit 24A going positive, indicating that terminal 10 attempted to establish communication with the central recorder prior to terminal 10A doing so. Thus, the output of flip-flop 406A stays at LL0 until after the termination of the communication link between terminal 10 and the central recorder.

Waveforms G–K of FIG. 6 illustrate the operation of the anti-contention circuit when both terminals 10 and 10A attempt to establish communication links with the central recorder 12 at the same time, waveforms G–J representing the output of oscillator 408 and the signal at circuit point F in circuit 24 and the output of corresponding oscillator 408A and the signal at the corresponding circuit point F in circuit 24A, respectively, and waveform K represents the corresponding voltage across data line 22. This situation occurs when the generators 408 and 408A in the terminals 10 and 10A happen to be approximately in phase and the signals at circuit point F in both terminals 10 and 10A go to LL1 during the time period between the same two corresponding output pulses of oscillators 408 and 408A, those two pulses being shown in FIG. 6 as occurring at approximately times $t_1$ and $t_2$. When this occurs, the load switches 410 and 410A in both circuits 24 and 24A are closed at approximately $t_2$ and, as shown at waveform K, the voltage across data lne 22 falls below the second voltage level indicated as V2. With the data line voltage below V2, an LL1 signal is applied through AND gate 416, the output of timer 414 being at LL1, and OR gate 418 to reset the flip-flop 406 and open load switch 410. The load switch 410A is likewise opened. As mentioned, the oscillators in circuits 24A and 24B operate at different frequencies. As illustrated in FIG. 6, the frequency of the oscillator in circuit 24 is slightly less than that of the oscillator in circuit 24A. At the next occurrence of an output pulse from oscillator 408, indicated in FIG. 6 as occurring at $t_3$, the pulses from oscillator 408 and 408A are somewhat out of phase and the LL1 pulse from oscillator 408 commences slightly prior to the LL1 pulse from oscillator 408. However, the system including load switch 410A, voltage detector 400, and AND gate 404 has a response period which must elaspse after the closure of load switch 410A to inhibit the closing of load switch 410. If the onset of LL1 pulses from oscillator 408 and 408A are not separated by at least that response period, load switch 410 will close even though load switch 410A has previously closed which will again result in the data line voltage falling below V2 and both load switches 410 and 410A being opened. In FIG. 6, commencement of the output pulses from oscillator 408 occurring at $t_3$, $t_4$, $t_5$, and $t_6$ are shown as being separated by periods of time less than the required response time. However, by the time pulse $t_7$ from oscillator 408 commences, the commencement of the LL1 pulses from oscillators 408 and 408A are sufficiently separated that load witch 410 is prevented from closing. In this case, the data line voltage remains above V2 and load switch 410A remains closed permitting communication between the terminal 10A and the central recorder.

The fall of the line voltage below the first voltage level is detected by high voltage detector 152 in central recorder 12 and flip-flop 160 is thus set to commence the operation of the central recorder as previously described. Single-shot multivibrator 156 provides a delay period between the fall of the data line voltage below the first voltage level and the commencement of operation of the central recorder. This insures that neither low voltage noise pulses on data line 22 nor the low voltage pulses resulting from the operation of the anti-contention circuit as shown in waveform K of FIG. 6 will be operative to trigger operation of the central recorder.

Timer 414 is provided in anti-contention circuit 24 so that data pulses intended for terminal 10 will not be effective to reset flip-fklop 406 and open load switch 410. Thus, after the output of flip-flop 406 has been at LL1 for a predetermined interval of time, the output of timer 414 goes to LL0 so that the output of voltage detector 402 may no longer be applied through gate 416 to the reset input of flip-flop 406. Low voltage detector 402 is then used to detect data pulses on data line 22. The Q output of flip-flop 406 may be applied to a first input of a two-input AND gate 426 and the output of timer 414 applied through an inverter 428 to the second input of AND gate 426. The output of AND gate 426 may then be used to indicate to the remainder of the circuit of terminal 10 that it is on the data line 22 and should be operative to receive and transmit data, such as by enabling operation of the bi-phase encoder and decoder 26.

In one apparatus constructed using this invention, the oscillators 408 in the anti-contention circuits had frequencies of approximatley 10 Hz., and the LL1 pulses generated at the outputs thereof had a duration of approximately 0.5 millisceconds, timer 414 had a delay period of approximately 6 milliseconds, and single-shot circuit 156 had a period of approximately 40 milliseconds. It is, of course, desirable to insure that in all of the terminals 10 used with any single central recorder 12 the frequenceis of operation of the oscillators 408 are slightly different.

It will thus be seen that line-seizing circuitry has been provided which fulfills each of the above-mentioned objects. In particular, circuitry has been provided which permits a plurality of remote terminals to use the same data line and insures that only one of the terminals will use the line at any time. The circuitry provided also includes means for breaking a tie should two terminals attempt to go on the data line essentially simultaneously, and also means for automatically putting a terminal ready to use the data line on the line immediately after the termination of the use of the line by another terminal. The tie-breaking circuitry provided insures that when two or more units require use of the line, each of the units has an essentially equal probability of acquiring the line first. This feature is to be contrasted with systems wherein all the terminals go on line in a predetermined order; in such systems, the terminals at the end of the order will always be required to wait a long period before going onto the data line and, when the system is particularly busy, may render the terminals at the end of the order relatively useless. Further, it will be apparent that when it is desired to add further terminals to a system using the disclosed line-seizing circuitry, they need merely be placed across the data line. No modifications need be made to the circuitry included within the apparatus already connected in the system. Indeed, in many applications using the line-seizing apparatus of this invention, no particular care need be taken to insure that the operating frequencies of the oscillators of the separate terminals are different as normal component tolerances, environmental differences, etc., will insure that sufficient differences exist.

While a particular embodiment of this invention has been disclosed, it will be understood, of course, that the invention is not to be limited thereto. Many modifications are possible to the general arrangement of the apparatus disclosed and, similarly, many modifications are possible to the detailed circuits disclosed. For example, the specific circuit disclosed above is responsive to the voltage across the data line. In different embodiments of this invention, it might also be possible to make the line-seizing circuitry responsive to the current through the data line, the frequency of an alternating current signal on the data line, or other parameters of a signal of the data line. It is contemplated, therefore, by the appended claims, to cover any such modifications as fall within the true spirit and scope of this invention.

We claim:

1. Line-seizing apparatus for establishing communication over a data line used in association with apparatus for generating an electric signal on the data line, said electric signal having a parameter with a nominal value when the data line is not in use, and comprising:

connecting means for coupling the line-seizing apparatus to the data line;

first parameter detection means coupled to said connecting means and generating a first electrical signal at an output when the parameter of the signal at said connecting means differs from the nominal value by an amount not exceeding a first predetermined amount;

second parameter detection means coupled to said terminal means and generating a second electrical signal at an output when the parameter of the signal at said connecting means differs from the nominal value by an amount not less than a second predetermined amount, said second predetermined amount being greater than said first predetermined amount;

first circuit means for repetitively generating a third electrical signal at an output;

second circuit means for generating a fourth electrical signal at an output when it is desired to seize the data line;

third circuit means for altering the impedance presented at said connecting means by the line-seizing apparatus in response to a fifth electrical signal at an input; and fourth circuit means coupled to said first parameter detection means output, said second parameter detection means output, said first circuit means output, said second circuit means output, and said third circuit means input for applying said fifth electrical signal to said third circuit means input in response to the simultaneous occurrence of said first, third, and fourth electrical signals and preventing said fifth electrical signal from being applied to said third circuit means input in response to the occurrence of said second electrical signal.

2. The line-seizing apparatus of claim 1 wherein said second circuit means further generates a sixth electrical signal at an output when it is desired to release the data line and said fourth circuit means further removes said fifth electrical signal from said third circuit means input in response to the occurrence of said sixth electical signal.

3. The line-seizing apparatus of claim 1 further comprising fifth circuit means coupled to said fourth circuit means for permitting said fifth electrical signal to remain applied to said third circuit means input despite the occurrence of said second electrical signal after said fifth electrical signal has been applied to said third circuit means input for a predetermined period of time.

4. Line-seizing apparatus for establishing communication over a data line used in association with apparatus for generating an electric current through said data line and comprising:

connecting means for coupling the line-seizing apparatus to said data line;

first voltage detection means coupled to said connecting means and generating a first electrical signal at an output when the voltage across the connecting means is above a first voltage level;

second voltage detection means coupled to said connecting means and generating a second electrical signal at an output when the voltage across the connecting means is above a second voltage level, said second voltage level being less than said first voltage level;

first circuit means for repetitively generating a third electrical signal at an output;

second circuit means for generating a fourth electrical signal at an output when it is desired to seize the data line;

third circuit means for altering the impedance presented at said connecting means in response to a fifth electrical signal at an input; and fourth circuit means coupled to said first voltage detection means output, said second voltage detection means output, said first circuit means output, said second circuit means output, and said third circuit means input for applying said fifth electrical signal to said third circuit means input in response to the simultaneous occurrence of said first, third, and fourth electrical signals and preventing said fifth electrical signal from being applied to said third circuit means input in response to the occurrence of said second electrical signal.

5. The line-seizing apparatus of claim 4 wherein said second circuit means further generates a sixth electrical signal at an output when it is desired to release the data line and said forth circuit means further removes said fifth electrical signal from said third circuit means input upon the occurrence of said second electrical signal.

6. The line-seizing apparatus of claim 4 further comprising fifth circuit means coupled to said fourth circuit means for permitting said fifth electrical signal to remain applied to said third circuit means input despite the occurrence of said second electrical signal after said fifth electrical signal has been applied to said third circuit means input for a predetermined period of time.

7. The line-seizing apparatus of claim 4 wherein said first circuit means comprises an oscillator.

8. The line-seizing apparatus of claim 7 wherein said fourth circuit means comprises a flip-flop circuit having a data input coupled to said first voltage detection means output and said second circuit means output, a clock input coupled to said first circuit means output, and a reset input coupled to said second voltage detection means output.

9. The line-seizing apparatus of claim 8 wherein said flip-flop reset input is additionally coupled to said second circuit means and is responsive to said sixth electrical signal.

10. The line-seizing apparatus of claim 9 wherein an output of said fifth circuit means is used to gate the application of a signal responsive to said second electrical signal to said flip-flop reset input.

11. Line-seizing apparatus for establishing communication over a data line having an electric signal thereon, said electric signal having a parameter with a nominal value when the data line is not in use, and comprising:

connecting means for coupling the line-seizing apparatus to the data line;

first parameter detection means coupled to said connecting means and generating a first electrical signal at an output when said parameter of the signal at said connecting means differs from the nominal value by an amount not exceeding a first predetermined amount;

second parameter detection means coupled to said terminal means and generating a second electrical signal at an output when said parameter of the signal at said connecting means differs from the nominal value by an amount exceeding a second predetermined amount, said second predetermined amount being greater than said first predetermined amount;

first circuit means for repetitively generating a third electrical signal at an output;

second circuit means for generating a fourth electrical signal at an output when it is desired to seize the data line;

third circuit means coupled to said connecting means for altering said parameter of said signal at said connecting means in response to a fifth electrical signal at an input; and fourth circuit means coupled to said first parameter detection means output, said second parameter detection means output, said first circuit means output, said second circuit means output, and said third circuit means input for applying said fifth electrical signal to said third circuit means input in response to the simultaneous occurrence of said first, third, and fourth electrical signals and preventing said fifth electrical signal from being applied to said third circuit means input in response to the occurrence of said second electrical signal.

* * * * *